United States Patent [19]
Harrell et al.

[11] 3,859,259
[45] Jan. 7, 1975

[54] VULCANIZABLE FLUOROELASTOMER

[75] Inventors: Jerald Rice Harrell, Wilmington, Del.; Walter Werner Schmiegel, Kennett Sq., Pa.

[73] Assignee: E. I. du Pont de Nemours and Company, Wilmington, Del.

[22] Filed: Aug. 22, 1973

[21] Appl. No.: 390,415

[52] U.S. Cl..... 260/77.5 R, 260/30.4 R, 260/42.27, 260/80.77
[51] Int. Cl. ...................... C08g 41/04, C08f 15/40
[58] Field of Search .................... 260/80.77, 77.5 R

[56] References Cited
UNITED STATES PATENTS

| | | | |
|---|---|---|---|
| 3,401,155 | 9/1968 | Borsini et al. | 260/87.7 |
| 3,449,305 | 6/1969 | Stilmar | 260/80.76 |
| 3,451,978 | 6/1969 | Chalmers et al. | 260/78.5 |
| 3,467,635 | 9/1969 | Brasen et al. | 260/80.76 |
| 3,579,474 | 5/1971 | Ro | 260/29.6 |
| 3,723,387 | 3/1973 | Nyce | 260/470 UP |

*Primary Examiner*—Stanford M. Levin

[57] ABSTRACT

A vulcanizable fluorelastomer having advantages over known fluoroelastomers for many applications can be prepared by copolymerizing

- A. about 50–65 mole percent of tetrafluoroethylene,
- B. about 5–26 mole percent of vinylidene fluoride and
- C. about 20–45 mole percent of at least one olefin component selected from the group: (1) propylene, (2) butene-1, (3) a mixture of about 0.1–50 mole percent of ethylene or isobutylene and about 50–99.9 mole percent of propylene or butene-1, and (4) a mixture of about 50 mole percent of ethylene and 50 mole percent of isobutylene.

4 Claims, No Drawings

VULCANIZABLE FLUOROELASTOMER

BACKGROUND OF THE INVENTION

This invention relates to copolymers which are vulcanizable fluoroelastomers. The invention also concerns compositions useful for preparing vulcanized (cured or crosslinked) fluoroelastomer articles.

The term "copolymer" as used herein means the product of copolymerizing two or more different monomers.

Each of the known copolymers which are vulcanizable fluoroelastomers has certain drawbacks which have limited its usefulness in many applications. For example, the fluoroelastomers made from vinylidene fluoride, hexafluoropropylene and optionally tetrafluoroethylene tend to be too expensive for some uses. Those made from tetrafluoroethylene, an olefin such as propylene, and phenoxyethyl vinyl ether are also rather expensive; and they leave something to be desired with respect to the ease of forming the copolymer, the odor of the formaldehyde type of crosslinking agent used in the curing operation, and the solvent swell resistance and low temperature flexibility of the cured product. Those made from tetrafluoroethylene, an olefin such as propylene, and optionally acrylic acid or 2-chloroethyl vinyl ether also do not have the desired low temperature flexibility for certain applications, and they often leave something to be desired with respect to the ease of preparing the cured product.

It is therefore known in the art that there is a need for a vulcanizable fluoroelastomer which will enable one to overcome the above-mentioned drawbacks of the prior art vulcanizable fluoroelastomer copolymers.

SUMMARY OF THE INVENTION

The present invention provides a vulcanizable fluoroelastomer which is the product of copolymerizing A. about 50–65 mole percent of tetrafluoroethylene,
B. about 5–26 mole percent of vinylidene fluoride and
C. about 20–45 mole percent of at least one olefin component selected from the group: (1) propylene, (2) butene-1, (3) a mixture of about 0.1–50 mole percent of ethylene or isobutylene and about 50–99.9 mole percent of propylene or butene-1, and (4) a mixture of about 50 mole percent of ethylene and 50 mole percent of isobutylene.

The invention also provides a crosslinked fluoroelastomer obtained by a process which comprises 1. providing a mixture of (a) a fluoroelastomer as defined above, (b) a compound able to function as a crosslinking agent for the fluoroelastomer and selected from the group: diamines and diamine carbamates, and (c) a compound able to accelerate the crosslinking reaction and selected from the group: quaternary ammonium compounds, quaternary phosphonium compounds, penta-substituted guanidines and salts thereof, trisubstituted amidines, cyclic polyethers and open-chain polyethers, and
2. heating the resulting mixture until the fluoroelastomer has undergone the desired amount of crosslinking.

The mixture of components used for preparing said crosslinked fluoroelastomer is also a part of the invention.

DESCRIPTION OF PREFERRED EMBODIMENTS

In preparing the novel fluoroelastomer, it is usually preferred to use about 10–26 mole percent of vinylidene fluoride based on the total number of moles of monomer used to form the copolymer. However, in applications where a relatively slow-curing composition is satisfactory and where good solvent resistance of the cured product is not important, one can use a lower vinylidene fluoride content (e.g., about 5–9 mole percent).

When component C consists of about 50 mole percent of ethylene and 50 mole percent of propylene, it is preferred to use at least about 30–35 mole percent of component C, especially in applications requiring good elasticity and flexibility.

The fluoroelastomer obtained from copolymerizing the above-described monomer components A, B and C contains polymerized units of said monomers in a molar ratio about equal to the ratio of monomers present in the copolymerforming reaction mixture. By using the monomer components in the proportions specified above, one obtains a copolymer which is an elastomer in the sense that it is capable of recovering quickly, forcibly and substantially completely from deformation resulting from stress below its yield value. This fluoroelastomer is, or can be modified with curing to be, insoluble in aromatic solvents such as benzene. The term insoluble of course does not necessarily mean that the copolymer will not undergo some degree of swelling while in contact with the solvent.

The novel fluoroelastomer in the majority of cases will have an inherent viscosity of about 0.01 or higher, with special preference for an inherent viscosity of about 0.2–3. The inherent viscosity is measured in the manner described below in Example 1.

In preparing the present fluoroelastomer, it is preferred that the reaction mixture of monomer components A, B and C also contains a free-radical initiator, and the copolymer-forming reaction is carried out as a free radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as sodium lauryl sulfate or ammonium perfluorooctanoate. The surfactant can be selected from those known to be useful in the manufacture of fluoroelastomer copolymers.

After completion of the preferred emulsion polymerization reaction, the fluoropolymer can be isolated from the resulting polymer latex by known methods, for example by coagulation by adding an electrolyte or by freezing, followed by centrifuging or filtering and then drying the polymer.

The copolymer-forming reaction can also be carried out in bulk, or in an organic liquid containing an organic free-radical initiator.

During preparation of the copolymer, the reaction mixture is preferably heated at about 50°–130°C. under superatmospheric pressure, for example under a pressure of about 100–2,000 p.s.i.g., preferably about 500–1,500 p.s.i.g. In some of the most useful embodiments of the process, the polymerization is carried out as a continuous process and the reaction mixture has an average residence time in the reactor of about 0.9–2.5 hours. Residence time can be calculated by dividing the reactor volume by the volume of latex produced per hour.

As indicated above, one can prepare crosslinked or cured fluoroelastomer products by mixing the novel copolymer with a suitable crosslinking agent and an accelerator, and heating the mixture until it is cured.

The crosslinking agent can be any one or more of the diamines (preferably aliphatic or alicyclic diamines), and diamine carbamates known to be useful for curing fluoroelastomers. Examples of useful diamines are N,N'-dicinnamylidene -1,6-hexane diamine, trimethylene diamine, cinnamylidene trimethylene diamine, cinnamylidene ethylene diamine, and cinnamylidene hexamethylene diamine. Examples of useful diamine carbamates are hexamethylene diamine carbamate, bis(4-aminocyclohexyl) methane carbamate, 1,3-diaminopropane monocarbamate, ethylenediamine carbamate and trimethylenediamine carbamate. One usually uses about 0.1–5 parts by weight of the crosslinking agent for each 100 parts of the copolymer. The accelerator can be any one or more of the following types of compounds already known to be useful for accelerating the crosslinking of fluoroelastomers: (1) quaternary ammonium compounds such as those described in U.S. Pat. No. 3,655,727 and Italian Pat. No. 932,319; (2) quaternary phosphonium compounds such as those described in U.S. Pat. No. 3,712,877 and French Pat. No. 71-20887; (3) penta-substituted guanidines and salts thereof, and trisubstituted amidines such as those described in U.S. Pat. No. 3,686,143; (4) cyclic polyethers such as those described in U.S. Pat. No. 3,580,889; and (5) open-chain polyethers such as those described in U.S. Pat. No. 3,524,836. One usually uses about 0.1–3 parts by weight of the accelerator for each 100 parts of the copolymer.

It is usually preferred that the curable composition also contain about 1–15 parts by weight (for each 100 parts of the copolymer) of a suitable metal compound selected from divalent metal oxides and/or hydroxides and optionally metal salts of weak acids. Such compounds are further described in U.S. Pat. No. 3,686,143.

In preparing the vulcanizable composition used for the production of the crosslinked fluoro elastomer in accordance with the present invention, one can mix the novel copolymer with the other ingredients by means of any mixing apparatus known to be useful for preparing rubber compositions, for example a roller-type rubber mill or a Banbury mixer. Known fillers, pigments, pore-forming agents and other additives can also be blended with the composition. A solvent for the copolymer can also be mixed with the composition if one wishes to form a liquid composition useful in the preparation of adhesive layers, coatings, films and the like.

The initial curing of the curable composition is preferably carried out by heating the composition for about 1–60 minutes at about 149°–204° C.; conventional rubber-curing presses, molds, extruders, and the like provided with suitable heating and curing means can be used. Also, if one wants a product having maximum heat resistance and dimensional stability, it is preferred to carry out a post-curing operation wherein the article is heated in an oven or the like for an additional period of about 1–48 hours at about 180°–300°C. One skilled in the art will realize that the best curing time and temperature for a particular application will depend on such factors as the nature and proportion of ingredients and the properties needed in the final product.

Fluoro elastomers of the present invention can easily be made in relatively economical grades suitable for compounding and curing by practical methods to yield highly useful cured elastomer articles for applications such as films, gaskets, O-rings and the like, which are resistant to damage by corrosive chemicals at high temperatures. The beneficial utility of the novel fluoroelastomer is discussed further in Example 1 below.

The following examples illustrate the invention; all amounts are by weight unless otherwise indicated.

EXAMPLE 1

A novel, curable fluoroelastomer of this invention is prepared by a continuous process composed of the following operations:

1. continuously feeding monomers to a 1-gallon (3.785 liter) stainless steel pressure vessel reactor (polymerization reaction zone), while operating the stirrer of the reactor at 700 rpm for thorough mixing of the reactor contents, and while the contents of the reactor are heated at 80°C. under a pressure of 600 psig so that the reaction mixture formed in operation (2) below will undergo an emulsion polymerization reaction as it passes through the reactor, the reactor residence time being about 2.4 hours based on the ratio of the 3.785 liter reactor to the emulsion output rate of about 1.6 liters per hour, the monomers being tetrafluoroethylene (feed rate of 4.8 moles per hour), propylene (feed rate of 2.19 moles per hour), and vinylidene fluoride (feed rate of 2.0 moles per hour);

2. during operation (1), feeding an aqueous solution of initiator, surfactant and base to the reactor through a metering pump at the rate of 1.2 liters per hour, the solution containing ammonium persulfate as initiator, sodium lauryl sulfate as surfactant, and sodium hydroxide as the base in an amount such that the initiator is fed at the rate of 0.06 mole per hour, dry basis, the surfactant is fed at the rate of 17.3 grams per hour, dry basis, and the base is fed at the rate of 0.18 mole per hour, thereby maintaining the reaction mixture at a pH of about 10;

3. continuously removing from the reactor the resulting copolymer latex which is continuously formed during operations (1) and (2), the latex being passed through a back-pressure regulating valve set to maintain the desired reactor pressure of 600 psig;

4. after discarding the latex obtained during the first 3⅓ residence times, collecting the desired quantity of latex, and mixing it for uniformity; and 5. isolating the resulting copolymer from the latex by the addition of 50 ml. of a 4 percent aqueous solution of potassium aluminum sulfate for each 100 ml. of latex, subjecting the resulting coagulated material to high shear conditions in a blender to break it up into small particles, washing the polymer particles with distilled water, and removing the water by means of a filter apparatus and then drying in an oven under reduced pressure at 60°C. in a slow stream of nitrogen.

The resulting copolymer is an elastomer which can be cured in the manner described below in Example 3; it contains in each 100 moles of polymerized units about 54.7 moles of polymerized tetrafluoroethylene, 24.6 moles of polymerized propylene and 20.7 moles of polymerized vinylidene fluoride. The copolymer has an inherent viscosity of 0.44; this property is measured at 30°C. at a polymer concentration of 0.5 percent by weight in a solvent composed of 50 percent by volume of tetrahydrofuran and 50 percent by volume of trichlorotrifluoroethane ("Freon" 113). The copolymer is insoluble in aliphatic and aromatic hydrocarbons. The copolymer has a Mooney viscosity of 54 at 100°C.; this measure of bulk viscosity is determined in a Mooney Viscometer using the large rotor and a 10-minute shearing time. The copolymer is useful in the manufacture of O-rings and other cured elastomer articles.

One skilled in the art, after reading the present disclosure, will have no difficulty in preparing other copolymers of the present invention in a similar manner to that described in Example 1 when using other proportions of the monomers and the other monomers of component (C) set forth above.

The copolymer obtained in Example 1, because of its low raw material cost, is more useful in many applications than known fluoroelastomers made from vinylidene fluoride, hexafluoropropylene and optionally tetrafluoroethylene, especially in applications not requiring maximum solvent swell resistance. The Example 1 copolymer is also more useful in many applications than known fluoroelastomers made from tetrafluoroethylene, propylene and phenoxyethyl vinylether because of (1) the ease of forming the Example 1 copolymer, (2) the elimination of the problem associated with using a formaldehyde type of crosslinking agent in the curing operation, (3) the superior solvent swell resistance, and (4) the superior low temperature flexibility of the cured product. The Example 1 copolymer is also more useful in many applications than known fluoroelastomers made from tetrafluoro ethylene, propylene, and optionally acrylic acid or 2-chloroethylvinylether because of the superior low temperature flexibility of the cured product and the ease of preparing the cured product.

EXAMPLE 2

Another copolymer of this invention is prepared by repeating Example 1 except the feed rate of the monomers in Step 1 is adjusted so that the copolymer obtained in Step 5 contains in each 100 moles of polymerized units about 50.6 moles of polymerized tetrafluoroethylene, 26.6 moles of polymerized propylene, and 22.9 moles of polymerized vinylidene fluoride. Also in Step 4 the latex obtained during the first four residence times is discarded.

The resulting copolymer has an inherent viscosity of 0.43 and a Mooney viscosity of 48; both values are measured in the manner described in Example 1.

EXAMPLE 3

The Example 1 copolymer is subjected to tests in the following manner.

Cured fluoroelastomer test samples for the tests described below (other than ODR Cure Test) are prepared from the copolymer obtained in Example 1 by a. mixing the following ingredients on a 2-roll rubber mill whose rolls are at about 25°C.: 100 parts of the Example 1 copolymer, 25 parts of carbon black (Austin Black, which is a finely pulverized bituminous coal obtained from the Chemical Products Division of Slab Fork Coal Co.), 5 parts of magnesium oxide ("Maglite" Y), 10 parts of calcium hydroxide, an accelerator component composed on one part of a mixture of 75 percent by weight of hydrated silica ("Silene" D) and 25 percent by weight of dodecyl tetramethyl guanidine, two parts of polyoxyethylene glycol of molecular weight 350 ("Carbowax" 350) and 1.8 part of hexamethylene diamine carbamate, b. heating the resulting curable mixture in a mold at 180°C. under a total pressure of 30,000 lbs. for 30 minutes; and c. post curing the samples in an oven in which a blower circulates the air while the temperature rises to 204°C. during a period of 4 hours and then remains at 204°C. for 24 hours.

Uncured test samples for the ODR Cure Test are prepared by repeating Step (a) above.

Results of testing the samples of the Example 3 composition can be seen below in Table I. The modulus, tensile and elongation values given in Table I are obtained at room temperature by ASTM Method D-412-66. Compression sets test values are obtained by ASTM Method D-395-61, Method B, using as test samples molded 1 × 0.139 inch O-rings and conducting the test at 204°C. for 70 hours. Shore Hardness (Durometer A) is tested by ASTM Method D-676. In the ODR Cure Test, which indicates the rate of cure, an oscillating disc rheometer is used at about 180°C. in a process which comprises oscillating a grooved biconical disc through an arc while pressed tightly between two pieces of the sample to measure relative viscosity, and, at certain intervals as the curing proceeds (the curing time in minutes shown in the left column), reporting the amount of torque (inch-pound readings in the numbered example columns) required to oscillate the disc as a measure of viscosity. One can use the resulting data to preparing curing curves by plotting viscosity values against time; the rate of cure is indicated by the slope of the curve at its steepest point.

The solvent swell values are obtained by measuring the percent increase in volume of the sample after 7 days of immersion in the solvent at 25°C. according to ASTM Method D-471-66. The Clash Berg stiffness values are obtained by ASTM Method D-1043-69.

TABLE I

| Example | 3 | 4 |
| --- | --- | --- |
| Tensile strengh, p.s.i. | 1880 | 1650 |
| Modulus — 100%, p.s.i. | — | 1400 |
| Elongation at break, % | 60 | 130 |
| Compression set | 64 | 58 |
| Shore hardness | 76 | — |
| ODR Cure (in.-lbs. of torque) | | |
| Cure time, min. | | |
| 0 | 3 | 2 |

TABLE I-Continued

| Example | 3 | 4 |
|---|---|---|
| 2.5 | 2 | 2 |
| 5 | 36 | 8 |
| 10 | 63 | 35 |
| 20 | 74 | 49 |
| 30 | 79 | 55 |
| Solvent swell, % | | |
| Benzene | 29.6 | 30.2 |
| Carbon tetrachloride | — | 28.4 |
| Hexane | 11.5 | 9.8 |
| Clash Berg stiffness | | |
| 10,000 psi at °F. | 29 | 29 |

EXAMPLE 4

The Example 2 copolymer is subjected to tests in the manner described in Example 3 except for the following changes in the Step (a) preparation of the curable mixture:
1. The Example 1 copolymer is replaced with the Example 2 copolymer.
2. The amount of calcium hydroxide is 5 parts.
3. The accelerator component is composed of 1.3 parts of a mixture of hydrated silica (60 percent) and dodecyltrimethyl ammonium chloride (40 percent).
4. The amount of polyoxyethylene glycol is 1.5 parts.

Results of testing the Example 4 composition can be seen above in Table I.

We claim:

1. A vulcanizable fluoroelastomer which is a copolymer containing interpolymerized units in an amount equal to A. about 50–65 mole percent of tetrafluoroethylene,
B. about 5–26 mole percent of vinylidene fluoride and
C. about 20–45 mole percent of at least one olefin component selected from the group: (1) propylene, (2) butene-1, (3) a mixture of about 0.1–50 mole percent of ethylene or isobutylene and about 50–99.9 mole percent of propylene or butene-1, and (4) a mixture of about 50 mole percent of ethylene and 50 mole percent of isobutylene.

2. A fluoroelastomer according to claim 1 wherein the amount of vinylidene fluoride is about 10–26 mole percent.

3. A crosslinked fluoroelastomer obtained by a process which comprises
   1. providing a mixture of (a) a fluoroelastomer as defined in claim 1, (b) a compound able to function as a crosslinking agent for the fluoroelastomer and selected from the group: diamines and diamine carbamates, and (c) a compound able to accelerate the crosslinking reaction and selected from the group: quaternary ammonium compounds, quaternary phosphonium compounds, penta-substituted guanidines and salts thereof, trisubstituted amidines, cyclic polyethers and open-chain polyethers, and
   2. heating the resulting mixture until the fluoroelastomer has undergone the desired amount of crosslinking.

4. As a novel composition useful for preparing a crosslinked fluoroelastomer, a mixture of components (a), (b), and (c) as defined in claim 3.

* * * * *